(12) United States Patent
Feng (10) Patent No.: US 6,978,934 B2
(45) Date of Patent: *Dec. 27, 2005

(54) METHOD AND APPARATUS FOR REDUCING DATA COLLECTION DEVICE POWER CONSUMPTION

(75) Inventor: Chen Feng, Bothell, WA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/664,834

(22) Filed: Sep. 16, 2003

(65) Prior Publication Data

US 2004/0060985 A1    Apr. 1, 2004

Related U.S. Application Data

(63) Continuation of application No. 09/667,919, filed on Sep. 22, 2000, now Pat. No. 6,655,591.

(51) Int. Cl.[7] .............................................. G06K 7/10
(52) U.S. Cl. ........................ 235/454; 323/267; 363/72
(58) Field of Search ........................... 235/454, 472.01, 235/462.1; 323/267; 363/72

(56) References Cited

U.S. PATENT DOCUMENTS

| | | | | |
|---|---|---|---|---|
| 5,059,777 A | * | 10/1991 | Wittensoldner et al. | 235/470 |
| 5,511,205 A | * | 4/1996 | Kannan et al. | 713/324 |
| 5,834,750 A | * | 11/1998 | Coleman et al. | 235/455 |
| 6,286,762 B1 | * | 9/2001 | Reynolds et al. | 235/472.01 |

* cited by examiner

Primary Examiner—Michael G. Lee
Assistant Examiner—Seung H Lee
(74) Attorney, Agent, or Firm—Amin & Turocy, LLP (57) ABSTRACT

A method and apparatus are provided for reducing power consumption in a data collection device. The method includes providing a power detector in an interface component of the data collection device and sensing the power delivered to the scan engine component of the device using the power detector. The power delivered to at least a portion of the interface component is selectively reduced according to the sensed power delivered to the scan engine component.

18 Claims, 5 Drawing Sheets

METHOD AND APPARATUS FOR REDUCING DATA COLLECTION DEVICE POWER CONSUMPTION

CROSS REFERENCE TO RELATED APPLICATIONS

This application is a continuation of application U.S. Ser. No. 09/667,919, filed on Sep. 22, 2000 now U.S. Pat. No. 6,655,591 and entitled "METHOD AND APPARATUS FOR REDUCING DATA COLLECTION DEVICE POWER CONSUMPTION", the entirety of which is hereby incorporated by reference as if fully set forth herein.

TECHNICAL FIELD

The present invention relates generally to data collection devices adapted for reading bar codes and other dataforms, and more particularly to a method and apparatus for minimizing power consumption in such devices.

BACKGROUND OF THE INVENTION

Portable data collection devices are widely used in the manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes.

Bar code dataforms come in a variety of different formats including one and two dimensional bar codes, matrix codes and graphic codes, as well as words and numbers and other symbols, which may be printed or etched on paper, plastic cards and metallic and other items. For example, a one dimensional bar code dataform typically consists of a series of parallel light and dark rectangular areas of varying widths. The light areas are often referred to as "spaces" and the dark areas as "bars". Different widths of bars and spaces define different characters in a particular bar code dataform.

Data originally encoded in a dataform is recovered for further use in a variety of ways. For example, a printed bar code may be illuminated to derive reflectance values which are digitized, stored in buffer memory and subsequently decoded to recover the data encoded in the bar code. The printed bar code may be illuminated using a laser, an array of LEDs, ambient light, or the like. The light reflected from the printed bar code typically is captured using a photosensor such as, for example, a CCD detector, CMOS detector, etc.

A problem associated with conventional dataform readers is power consumption. The reader devices are typically used for short periods of time, between which the units are inactive. Conventional handheld dataform readers typically include two major components housed within a plastic enclosure. A scan engine is provided for reading a dataform and encoding the data therefrom, and a host interface board is included for providing power to the scan engine and for communicating data from the scan engine to other devices, such as computers, modems, and/or transmitters. The scan engine and the interface are commonly separate circuit boards or modules, interfacing via one or more cables and/or connectors.

Many mobile or portable data collection devices are powered via batteries. In such battery powered devices, it is desirable to minimize the frequency of battery replacements or recharges. As such, minimizing power consumption is an important design consideration. Some conventional scan engine units include circuitry to implement a low power or sleep mode, which may be engaged based upon inactivity for a certain time period. However, in present designs, only the scan engine unit enters into a sleep mode, while the interface board circuitry power consumption continues. Accordingly, there remains a strong need for further reducing the power consumption of handheld data collection devices, with minimal cost increase and/or modification to the components thereof.

SUMMARY OF THE INVENTION

The present invention includes a method and apparatus providing reduced data collection device power consumption, which utilizes existing scanning engine components. The invention may be applied in many systems which include a master component obtaining power via a slave component. However, the invention finds particular utility in data collection devices having a scan engine component and an interface component, such as portable hand-held bar code dataform readers.

According to one aspect of the invention, there is provided a method for reducing power consumption in a data collection device. The method includes providing a power detector in the interface component, sensing power delivered to the scan engine component using the power detector, and selectively reducing power delivered to at least a portion of the interface component according to the sensed power delivered to the scan engine component. The portion of the interface component for which power is selectively reduced may include a communications transceiver. For example, where a data collection device, such as a portable bar code reader includes a scan engine component deriving power from a power source via a host interface circuit board with a communications transceiver, the invention allows a power detector to selectively place the communications transceiver (and/or any other component of the interface board) in a low power state based on the power drawn by the scan engine component.

The scan engine may be adapted to enter a low power state, for example, where no user activity has occurred for a predetermined time period. The power detector according to an aspect of the invention may sense the reduced power consumption of the scan engine component via a current sensor, and selectively power down one or more components one the interface board. The provision of a power detector component on the interface board employs the low power mode logic mechanism of the scan engine component through sensing the power passing through the interface board from the power source to the scan engine. The invention thus provides a low cost solution to the problem of communications transceivers and other interface board components drawing power when the scan engine for which they provide service is in a low power or 'sleep' mode. In addition, no modifications to the scan engine are required, since the invention utilizes existing power feed signals on the interface board itself. It will be appreciated that although the power detector component may be a separate module or circuit board within a data collection device, that the power detector may be incorporated directly into the host interface board of such devices in accordance with another aspect of the invention.

According to another aspect of the invention, the power detector comprises a current detector adapted to sense current delivered to the scan engine component. In this regard, sensing the power delivered to the scan engine component in the methodology of the invention may further comprise determining whether the current delivered to the scan engine component is less than a threshold value. The threshold may represent, for example, a current level lower than the normal operating current of the scan engine component and higher than the low power or 'sleep' mode current draw of the scan engine. Accordingly, selectively reducing power delivered to a portion of the interface component according to the sensed power delivered to the scan engine component may further comprise selectively reducing the power delivered to a portion of the interface component if the current delivered to the scan engine component is less than the threshold value.

In this fashion, the power detector may determine that the scan engine is in 'sleep' mode, and selectively power down one or more interface board components accordingly. Although the invention is illustrated herein in association with powering down a communications transceiver upon detection that a collection device scan engine has entered 'sleep' mode, it will be appreciated that any or all the circuitry on an interface board in such a device may be likewise powered down, and that the invention may be employed in devices other than bar code readers and data collection devices. In addition, it will be appreciated by those skilled in the art that forms of power draw sensors other than current sensing devices may be employed, which are contemplated as within the scope of the invention.

In accordance with another aspect of the invention, there is provided a data collection device comprising a scan engine component, an interface component, a power source component adapted to deliver power to the scan engine component and the interface component, means for sensing power delivered to the scan engine component, and means for selectively reducing power delivered to at least a portion of the interface component according to the sensed power delivered to the scan engine component. The portion of the interface component for which power is selectively reduced may include a communications transceiver, and the means for sensing power delivered to the scan engine component may comprise a current detector which is adapted to sense current delivered to the scan engine component and to determine whether the current delivered to the scan engine component is less than a threshold value. In addition, the means for selectively reducing power delivered to a portion of the interface component may include a switching device adapted to selectively reduce the power delivered to a portion of the interface component if the current delivered to the scan engine component is less than the threshold value.

According to yet another aspect of the invention, a data collection apparatus is provided, which includes a scan engine component adapted to read a dataform (e.g., a bar code), a power source adapted to provide power to the scan engine, and an interface component receiving power from the power source and having a communications transceiver and a power detector component adapted to sense power delivered from the power source to the scan engine component and to selectively reduce power delivered from the power source to the communications transceiver according to the sensed power delivered to the scan engine component. The power detector component may further include a current sensor, a comparator, and a switch, wherein the current sensor is adapted to sense the current delivered to the scan engine component and to provide an output signal representative of the current delivered to the scan engine. In this regard, the comparator may be adapted to receive the output signal from the current sensor and to compare the value of the output signal to a threshold, and the switch may be adapted to selectively reduce power delivered from the power source to the communications transceiver according to an output signal from the comparator.

According to still another aspect of the invention, there is provided a method of reducing power consumption in a system having a master component, a slave component, a power source providing power to the master component and the slave component, and a power detector component adapted to sense power provided to the master component and to control the power provided to the slave component. The method includes sensing power provided to the master component using the power detector component, and controlling the power provided to the slave component using the power detector component according to the power provided to the master component. The method may further include comparing the power provided to the master component with a threshold, wherein controlling the power provided to the slave component comprises selectively reducing the power provided to the slave component if the power provided to the master component is less than the threshold.

The power detector component may advantageously include a current sensor adapted to sense the current delivered to the master component, a comparator component receiving a first input signal from the current sensor representative of the current delivered to the master component and having a second input signal representative of the threshold, and a switch movable between an open state and a closed state controlling the power provided to the slave component according to a control signal received from an output of the comparator. In this regard, selectively reducing the power provided to the slave component may comprise moving the switch to the open state via the control signal form the output of the comparator if the first input signal representative of the current delivered to the master component is less than the second input signal representative of the threshold. In addition, where the master component (e.g., a data collection device scan engine) has a normal operating mode corresponding to a first current value and a low power mode corresponding to a second current value, the first current value being greater than the second current value, and wherein the threshold has a value between the first and second current values, the power thus provided to the slave component may be selectively reduced when the master component is in the low power mode, in order to achieve power consumption savings when the unit is not being operated. In this regard, the master component may be a data collection device scan engine, and the slave component may be a data collection device communications transceiver.

In accordance with yet another aspect of the invention, there is provided a data collection device, comprising a master component, a slave component, a power source adapted to provide power to the master component and the slave component, and a power detector component adapted to sense power provided to the master component and to selectively control the power provided to the slave component according to the sensed power provided to the master component. The master component may include a scan engine, and the slave component may comprise a communications transceiver.

To the accomplishment of the foregoing and related ends, certain illustrative aspects and implementations of the present invention are hereinafter described with reference to the attached drawing figures. The following description and the annexed drawings set forth in detail certain illustrative applications and aspects of the invention. These are indicative, however, of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference numerals are used to refer to like elements throughout. It should be understood that the description of these features are merely illustrative and that they should not be taken in a limiting sense. The invention includes an apparatus and methodology for reducing power consumption, particularly applicable to powering down a data collection device communications transceiver on a host interface board according to the power draw of a scan engine component. However, the invention finds utility in applications other than those specifically illustrated and described herein.

Figure 1:
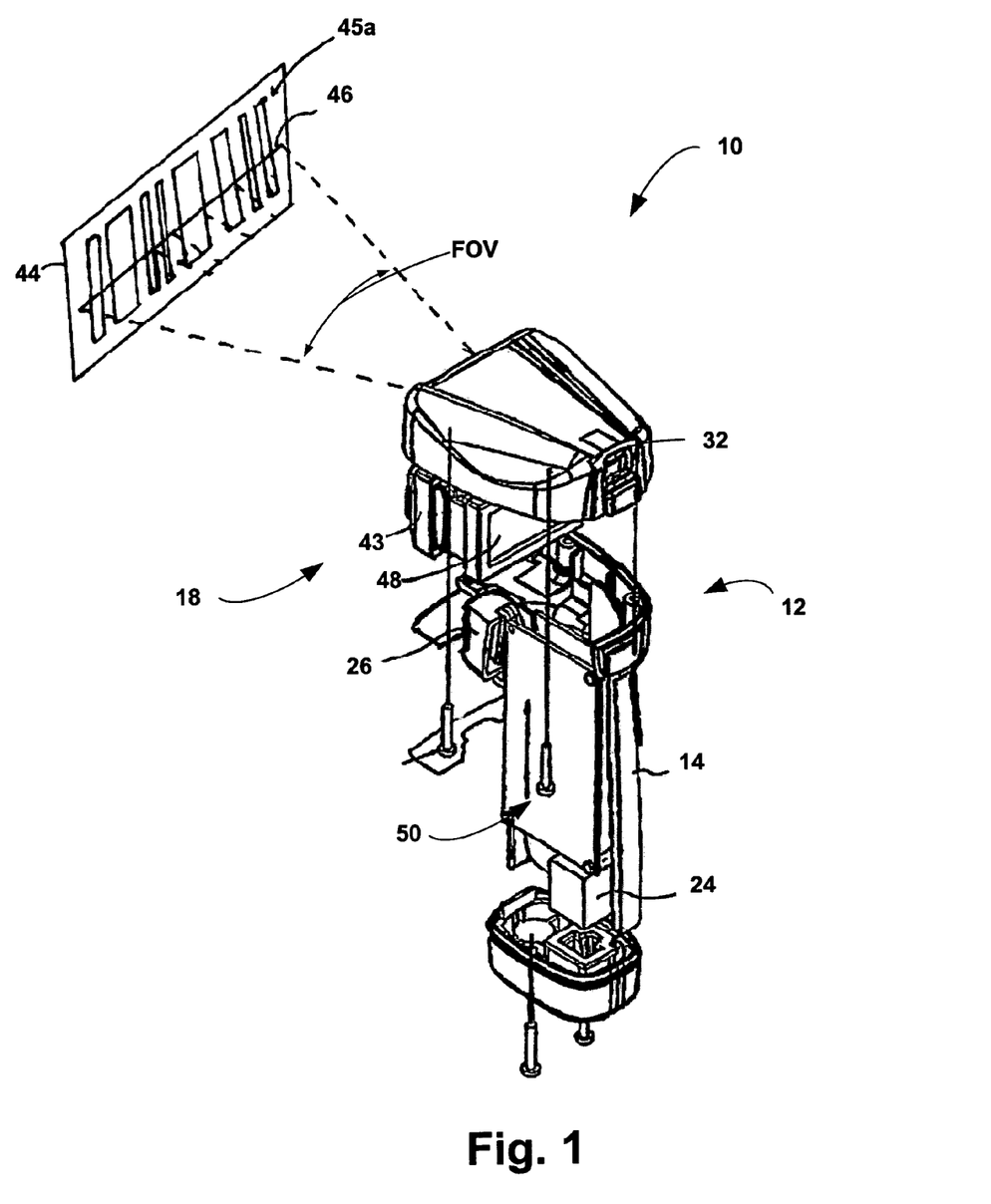
FIG. 1 is a partial exploded view of an exemplary portable data collection device in accordance with one aspect of the present invention.

Referring now to FIG. 1, a portable hand-held data collection device is illustrated generally at 10, in which the apparatus and methodologies of the present invention may be advantageously employed. The device 10 includes a scan engine or photosensor array imaging assembly 18 which is capable of imaging a target dataform 45a located within an imaging target area 44 of the scan engine 18. The scan engine 18 includes a single mirror and single lens assembly wherein the mirror provides to the lens a field of view FOV. The mirror is arranged to direct an image received from the field of view FOV along a target line 46 to a photosensor array 48. An image processing circuit coupled to the photosensor array 48 receives pixel data from each zone of the photosensor array 48 and reconstructs the image directed by the mirror along the target line 46.

The data collection device 10 includes a housing 12 defining an interior region for containing various mechanical and electrical components as described herein. The housing 12 includes a gripping portion 14 sized to be grasped in the hand of an operator. Coupled to the housing 12 is a dataform reading trigger switch or actuator 26. The dataform reading trigger switch 26 is positioned to be depressed by an index finger of the operator while the gripping portion 14 of the housing 12 is held in the operator's hand. Also supported within the housing 12 is a power source 24 such as a rechargeable battery for supplying operating power to the portable data collection device 10.

The housing 12 also includes a small opening through which a portion of an indicator light emitting diode (LED) 32 is visible. The indicator LED 32 alternates between three colors. The color green is displayed by the indicator LED 32 when the device 10 is on standby, ready for use. The color orange is displayed with the device 10 has successfully completed an operation such as decoding a target dataform. The color red is displayed when the device 10 is not ready to perform an operation. Device 10 may alternatively or in combination include a speaker or other audio annunciator (not shown) by which a user may be signaled that a successful dataform scan operation has been completed.

Figure 2:
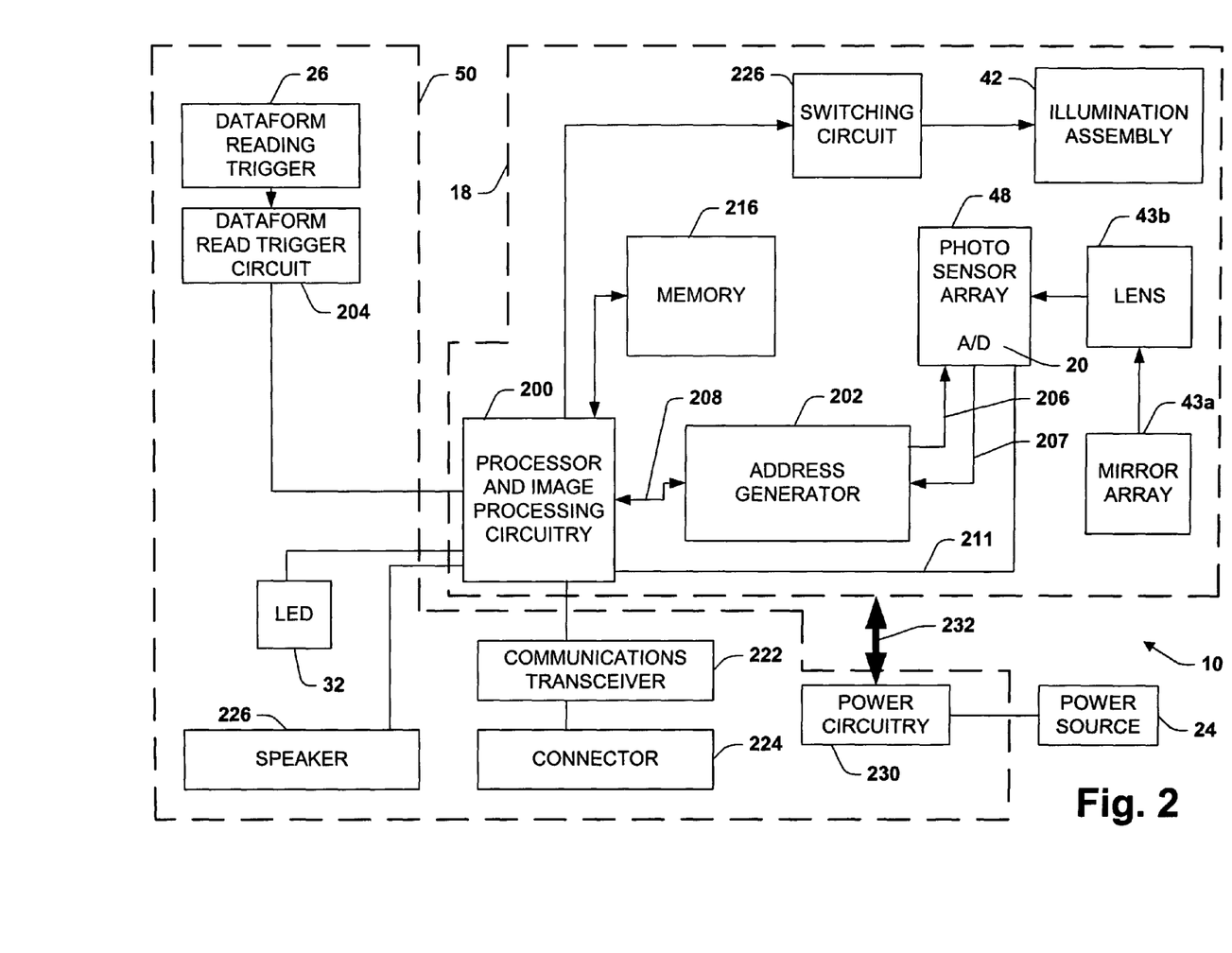
FIG. 2 is a schematic diagram illustrating another exemplary data collection device in accordance with the invention.

The scan engine 18 is disposed within a top portion of the housing 12 and includes the lens (not shown), mirror assembly 43, photosensor array 48 and illumination assembly 42 (FIG. 2). In the present embodiment of the invention, the illumination assembly 42 is an array of LEDs, however, it will be appreciated that various other illumination sources such as a laser assembly could alternatively be used. The scan engine 18 derives electrical power from the power source 24 via electrical connections (not shown) passing through a host interface board 50. Interface board 50 may further include the dataform reading trigger switch 26 and associated circuitry (not shown), an audio speaker to indicate to a user that a successful scan has occurred, a power detector component (not shown), and a communications transceiver, as illustrated and described in greater detail hereinafter.

When the device 10 has been inactive for a certain time (which time may be adjusted or set by a user), the scan engine component 18 may enter a low power or 'sleep' mode in which the scan engine component 18 draws only minimal current (e.g., less than about 1 ma) from the power source 24 via interface 50. As illustrated and described in greater detail infra, power detection and control circuitry or components on the host interface board 50 may be adapted to sense the reduced current drawn by the scan engine component 18 in the 'sleep' mode, and to selectively reduce the power supplied to one or more components (e.g., communications transceiver) in the interface 50 or other components in the device 10 according to an aspect of the invention.

Turning now to FIG. 2, a block diagram of an exemplary data collection device 10 is provided, including a scan engine component 18 and a host interface component 50. In the scan engine component 18, a microprocessor 200 controls the various operations and performs image analysis in decoding a target dataform as is described more fully infra. The microprocessor 200 may be programmed to carry out the various control and processing functions utilizing conventional programming techniques. For example, the microprocessor 200 may be programmed to determine whether the unit 10 has been inactive for a predetermined time period (e.g., using one or more software timers), and to enter the low power or 'sleep' mode based on this determination. A memory 216 coupled to the microprocessor 200 serves to store the various programs and other data associated with the operation of the data collection device 10 as described herein. A person having ordinary skill in the art will be able to program such operations without undue effort. Hence, additional detail is omitted for sake of brevity.

The microprocessor 200 is coupled to an address generator 202, via a local bus 208, which is designed to output a sequence of pixel addresses corresponding to a desired pixel data readout pattern from photosensor array 48. For example, the microprocessor 200 may be configured to read out consecutive horizontal lines of pixel data from multiple zones so that such pixel data can be processed to reconstruct the entire dataform provided within the field of view FOV of the data collection device 10.

The addresses are provided from the address generator 202 to the photosensor array 48 via an address bus 206. The photosensor array 48 provides, as its output data, pixel data on data bus 207 which corresponds to the address provided on bus 206. The address generator 202 in turn provides the pixel data to the microprocessor 200 via bus 208. Data may therefore be collected from the photosensor array 48 substantially in real time according to a predefined data readout pattern. It will be appreciated that while the present embodiment depicts the address generator 202 as being physically separated from the photosensor array 48, it is possible for both components to be provided on a single chip.

The device 10 further includes a host interface board 50 including the trigger switch 26 and associated data form read trigger circuitry 204. In order to carry out a dataform reading operation, the operator points a mirror array 43a towards the target dataform. Light is directed by the mirror array 43a to a lens 43b which focuses the light on the photosensor array 48. The operator then initiates the dataform read operation via the trigger switch 26 or other methods. The dataform read trigger circuit 204 generates an interrupt signal which is provided to the microprocessor 200 indicating the initiation of a dataform reading operation. The microprocessor 200 communicates with the address generator 202 via the control bus 205 which causes the address generator 202 to begin generating addresses for the predefined readout pixel pattern.

The image data from the photosensor array 48 consists of digital data indicative of the instantaneous illumination of the pixel. In the exemplary device 10 illustrated in FIGS. 1 and 2, it is assumed that the target dataform 45b is made up of a series of black and white bars/spaces. The photosensor array 48 includes an analog to digital (A/D) converter 210 therein for converting analog pixel data obtained from the addressed pixels to digital pixel data. The A/D converter 210 has adjustable gain which may be adjusted via a gain adjust control signal provided on line 211 from the microprocessor 200. The digitized pixel data from the photosensor array 48 is provided via the address generator 202 to the microprocessor 200. The microprocessor 200 evaluates the range of the acquired pixel data on-the-fly to see if the full range of the A/D converter 210 is utilized. If not, the microprocessor 200 adjusts the gain of the input to the A/D converter 210. The microprocessor 200 then proceeds to decode the image of the target dataform for the field of view FOV as discussed in more detail below.

Additionally, the microprocessor 200 is coupled to the illumination assembly 42 via switching circuitry 226 which enables the microprocessor 200 to control the illumination assembly 42 to provide general illumination and targeting during operation. As mentioned above, the illumination assembly 42 of the present embodiment may employ any of various light sources whose output light is sculpted to be spread across a dataform. Finally, it is noted that the microprocessor 200 may be coupled to the LED 32 to adjust its color state to exhibit the current mode of operation as mentioned above.

The host interface board component 50 of the data collection device 10 further includes a communications transceiver 222 (e.g., RS-232, RS-485) and a connector 224 for transmitting and receiving data to and from remote devices, such as computers, modems, transmitters, etc, along with the LED 32 and a speaker 226. In addition, interface 50 includes power circuitry 230 and electrical connections 232 for providing electrical power from the power source 24 to the various components of the interface 50 as well as the scan engine component 18 as illustrated and described in greater detail hereinafter. In accordance with an aspect of the invention, the circuitry 230 may be adapted to sense the power delivered to the scan engine component 18 and to selectively reduce or discontinue power delivered to one or more components (e.g., components 204, 32, 222, 224, and/or 226) on the interface 50 according to the sensed power delivered to the scan engine component 18.

Figure 3:
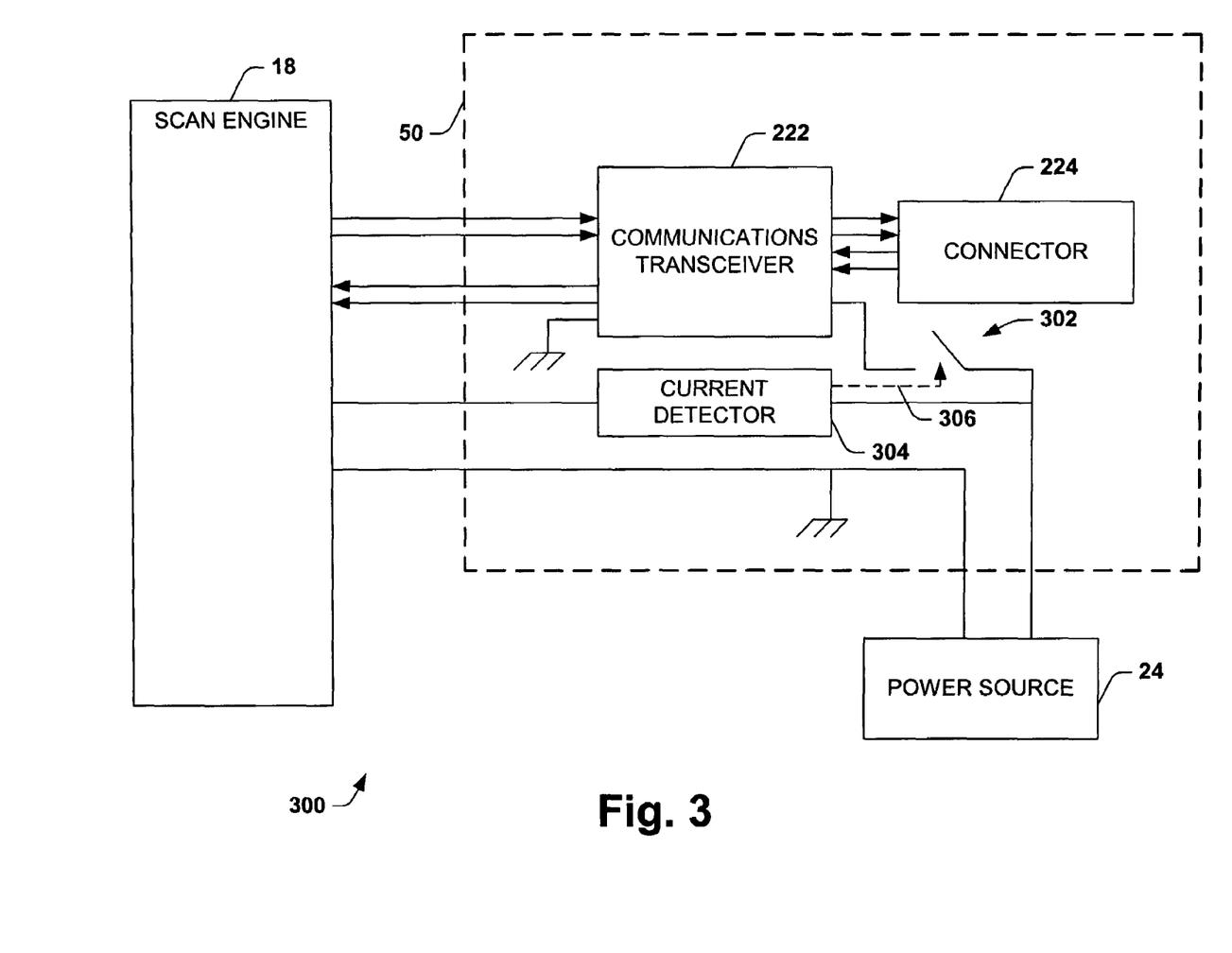
FIG. 3 is a schematic illustration of another exemplary data collection device in accordance with the invention.

Referring now to FIG. 3, another exemplary data collection device 300 is illustrated in accordance with the invention. The device 300 includes a scan engine component 18 having electrical connections (not numerically designated) with a host interface board component 50, for receiving power therefrom and exchanging data therewith. The interface 50 includes a communications transceiver 222 and an associated connector 224, allowing data (not shown) from a successful dataform scan to be sent to external devices (not shown), such as computers, modems, transmitters, and the like. The power source 24 is connected to the interface 50 for providing electrical power to communications transceiver 222 through a switching device 302 and to the scan engine component 18 through a current detector 304. Detector 304 is adapted to sense or measure the power (e.g., current) drawn by the scan engine component 18, and to provide a control signal 306 to control the operation of the switching device 302 according to the measured or sensed power draw of the scan engine component 18.

The device 300 is thus adapted for conservation of power from the power source 24. For example, the scan engine component 18 may enter a low power or 'sleep' mode based on non-use for a specified time period. In this low power mode, the scan engine component 18 draws minimal or no current (e.g., less than about 1 ma) from the power source 24 via the interface board 50. The current detector 304 may be adapted to sense the drop in scan engine component power draw, and accordingly open the switching device 302 via control signal 306. This provides further power savings, as the communications transceiver 222 need not be powered when the scan engine 18 is inactive. It will be noted in this regard, that other components of the device 300, whether on the interface board 50 or elsewhere, may be selectively powered down according to the invention.

Furthermore, the employment of the detector 304 on the interface board requires no additional electrical connections between the scan engine 18 and the interface board 50, in order to sense the power drawn by the scan engine 18 and to reduce the power to the communications transceiver 222. This means that existing scan engine components 18 may be utilized in accordance with the invention without modification thereto. Moreover, the current detector 304 and switching device 302 add minimal cost to the interface board 50. In this manner, significant power savings may be achieved, which is important where, for example, the power source 24 is a battery, as is typical in portable, hand-held bar code readers and other data collection devices.

Figure 4:
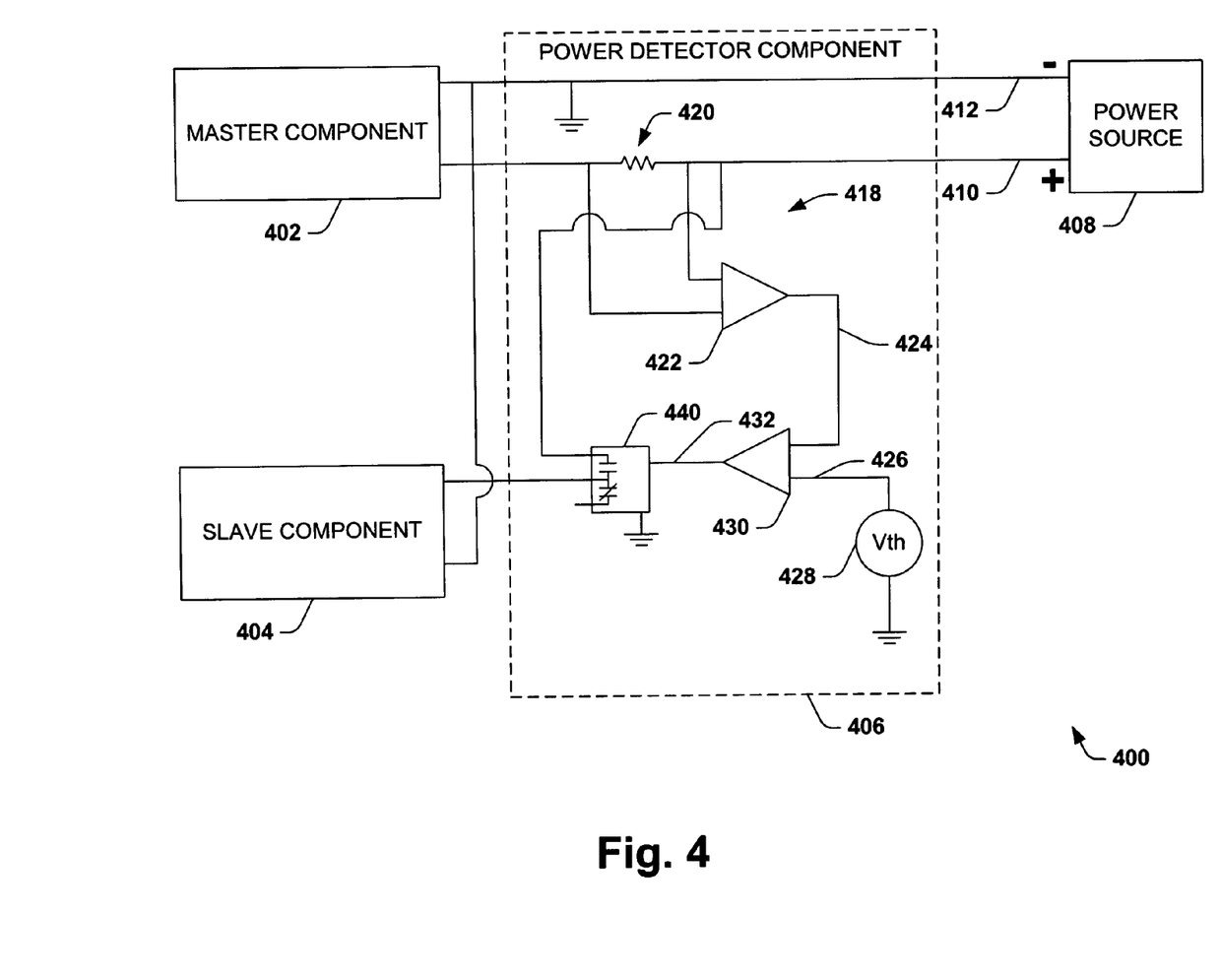
FIG. 4 is a schematic illustration of an exemplary system having a master component, a slave component, and a power detector component in accordance with another aspect of the invention.

Referring now to FIG. 4, an exemplary system 400 is illustrated having a master component 402 (e.g., scan engine component 18), a slave component 404 (e.g., communications transceiver 222), and a power detector component 406 providing connection between a power source 408 and the master and slave components 402 and 404, in accordance with another aspect of the invention. The power detector component 406 receives power from the power source 408 via plus and minus power connections 410 and 412, respectively, and is adapted to sense the power provided to the master component 402 via a current sensor 418 comprising a current sense resistor 420 and a difference amplifier 422. The current sensor 418 is further adapted provide an output signal 424 representative of the current delivered to the master component 402.

The signal 424 is input by a comparator 430 together with a threshold value signal 426 from a threshold reference voltage source 428. The comparator 430 compares the value of the output signal from amplifier 422 to the threshold value, and provides a control signal 432 to a switching device 440 (e.g., switch, relay, transistor) operatively connected to selectively provide power from the power source 408 to the slave component 404 according to the comparator output signal 432. In this way, the switching device 440 is adapted to selectively reduce power delivered from the power source 408 to the slave component 404 according to the amount of power provided to the master component 402. For example, the master component 402 may have two operating modes, wherein a normal operating current is drawn from the power source 408 in the first mode, and wherein a minimal (or zero) current is drawn in a second low power or 'sleep' mode. The threshold signal 426 from the threshold reference voltage source 428 may be set corresponding to a value less than the normal operating current required by the master component 402, and greater than the minimal current drawn be the master component 402 in the second low power or 'sleep' mode.

In this way, the power associated with one or more components (e.g., slave component 404) of the system 400 (whether resident in the power detection system 406 or elsewhere) may be conserved when not needed, based on the transition of the master component from a first or normal operational mode to a second low power or 'sleep' mode. For instance, the communications transceiver component 222 of the host interface board 50 in FIG. 3 may be powered down according to the transition of the scan engine component 18 into a low power 'sleep' mode.

Figure 5:
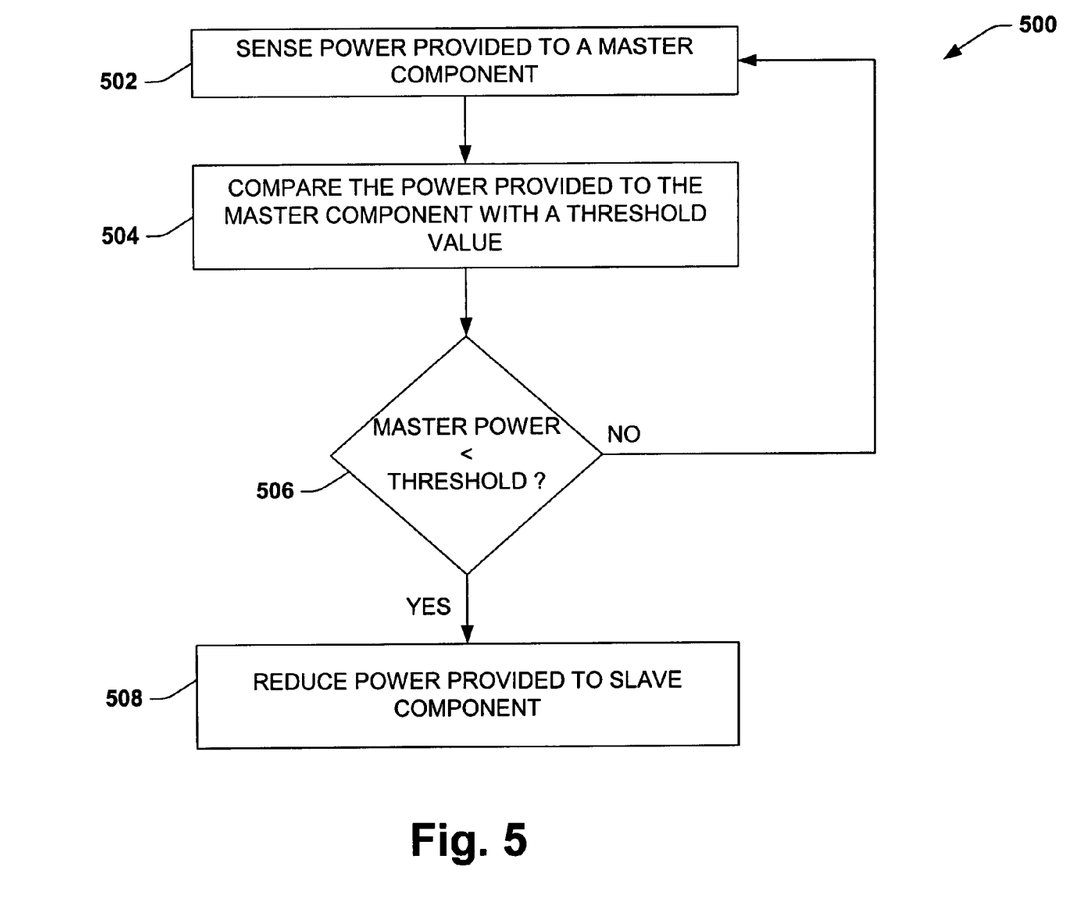
FIG. 5 is a flow diagram illustrating an exemplary method for reducing power consumption in accordance with another aspect of the invention.

Referring now to FIG. 5, and exemplary method 500 is illustrated for reducing power consumption in accordance with another aspect of the invention. The method may be employed with the various systems and apparatus illustrated and described herein. However, it will be appreciated by those skilled in the art that the exemplary method 500 may be employed in systems not shown in accordance with the invention. Beginning at step 502, the power provided to a master component (e.g., component 18 or 402 of FIGS. 3 and 4, respectively) is sensed (e.g., via detector 304 or component 406, respectively). A comparison is then made at step 504 between the power provided to the master component and a threshold value (e.g., threshold signal 426 from the threshold reference voltage source 428 of FIG. 4). If the master component power is less than the threshold value at decision step 506, the amount or power provided to a slave component (e.g., communications transceiver 222 or slave component 404 of FIGS. 3 and 4, respectively) is reduced at step 508. The methodology 500 thus provides for power savings of one component based on the transition of another component into a low power or 'sleep' mode.

Although the invention has been shown and described with respect to a certain aspects and implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary aspects of the invention. In addition, while a particular feature of the invention may have been disclosed with respect to only one of several implementations, such feature may be combined with one or more other features of the other aspects as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A system that powers a master-slave device arrangement comprising:
   a power source that powers a master device, that is a scan engine of a data collection device, through a slave device connected thereto; and
   a power detector that senses power provided to the master device and based thereupon regulates power to the slave device.

2. The system of claim 1, the power detector is part of the slave device.

3. The system of claim 1, the power detector comprises a comparator.

4. The system of claim 3, the comparator compares an indicator of power provided to the master device with a threshold value.

5. The system of claim 4, the indicator is an electrical current.

6. The system of claim 3, the power detector comprises a switch that selectively regulates power to the slave device based on an output signal from the comparator.

7. The system of claim 3, the power detector reduces the power to the slave device.

8. The system of claim 3, the power detector increases the power to the slave device.

9. The system of claim 1, the slave device is a part of an interface component of the data collection device.

10. The system of claim 9, the slave device comprises a communication transceiver.

11. The system of claim 10, the comparator comprises a current sensor that provides a signal being representative of the current delivered to the master device.

12. A system that powers a master-slave device arrangement comprising:
    means for powering a master device, that is a scan engine of a data collection device, through a slave device connected thereto;
    sensing means for detecting amount of power provided to the master device; and
    means for regulating power to the slave device based on an output of the sensing means.

13. A method for powering a master-slave device arrangement comprising:
    providing a master device operatively connected to a slave device, the slave device having a power detector that senses power provided to the master device;
    regulating power to the slave device based at least in part on an output of the power detector; and
    providing a data scan engine as part of the master device.

14. The method of claim 13 further comprising, selectively reducing power to the slave device.

15. The method of claim 13 further comprising, detecting an indicator of the power provided to the master device.

16. The method of claim 13 further comprising, comparing the indicator to a threshold value.

17. The method of claim 13 further comprising, increasing or decreasing power to the slave device based on the comparing act.

18. The method of claim 13 further comprising, providing an interface component of the data collection device as part of the slave device.

* * * * *